UNITED STATES PATENT OFFICE.

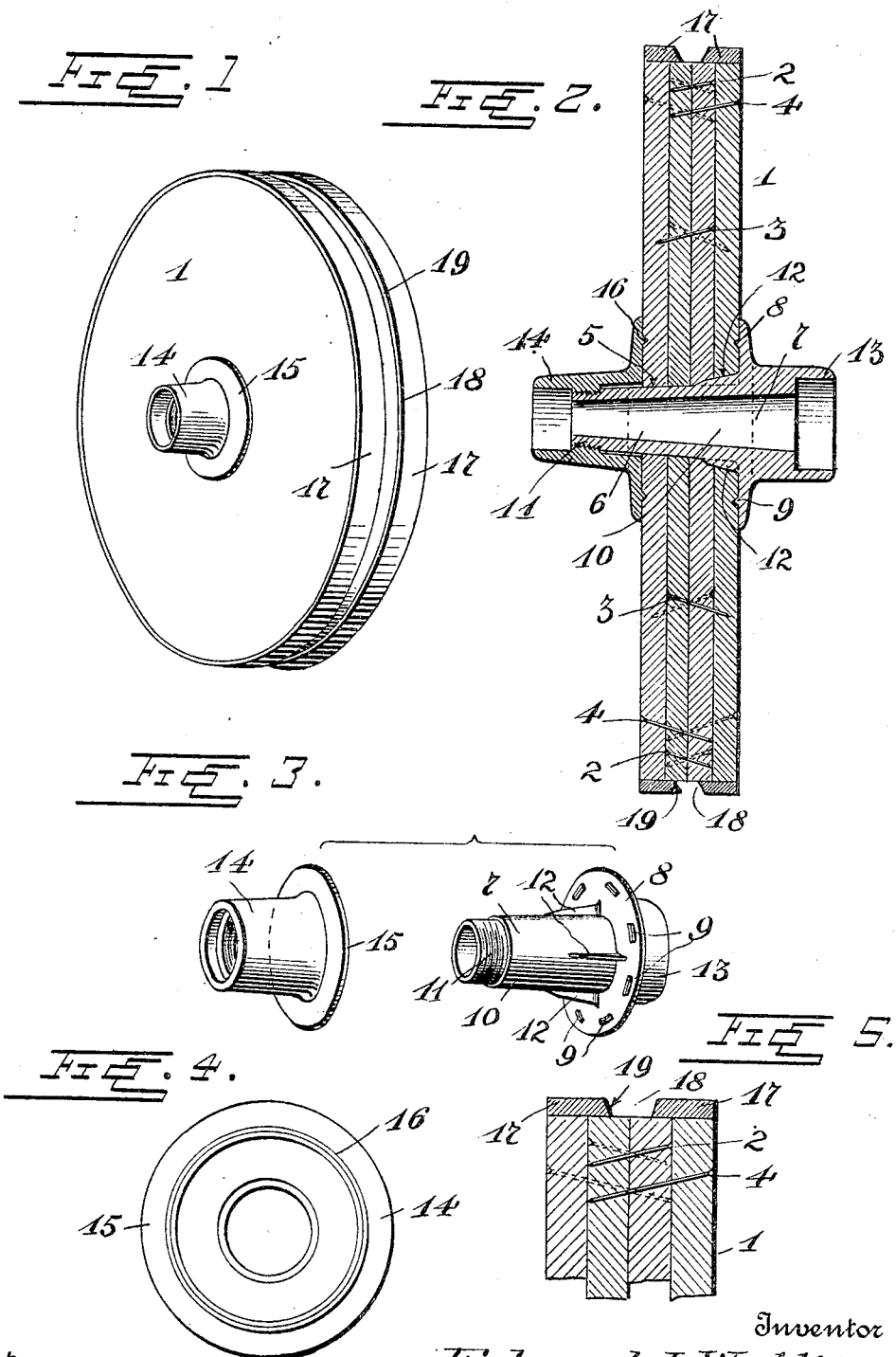

EDMUND J. WATKINS, OF HILLSDALE, MICHIGAN.

WHEEL.

No. 800,519.  Specification of Letters Patent.  Patented Sept. 26, 1905.

Application filed December 22, 1904. Serial No. 238,025.

*To all whom it may concern:*

Be it known that I, EDMUND J. WATKINS, a citizen of the United States, residing at Hillsdale, in the county of Hillsdale and State of Michigan, have invented certain new and useful Improvements in Wheels; and I do declare the following to be a full, clear, and exact description of the invention, such as will enable others skilled in the art to which it appertains to make and use the same.

This invention relates to wheels.

The object of the invention is to improve the construction of wheel shown in United States Letters Patent No. 678,149, issued to me July 9, 1901, whereby a stronger, simpler, and less expensive wheel is formed, means being provided in the new form whereby the traction resistance is decreased.

With this and other objects in view the invention consists of certain novel features of construction, combination, and arrangement of parts, as will be hereinafter described and claimed.

In the accompanying drawings, Figure 1 is a perspective view of a wheel constructed in accordance with the invention. Fig. 2 is a vertical sectional view of the same. Fig. 3 is a perspective view of the hub removed from the wheel and showing the parts separated. Fig. 4 is a view of the inner side of the outer portion of the hub, and Fig. 5 is an enlarged detail view of the outer edge or rim of the wheel and the tires arranged thereon.

Referring more particularly to the drawings, 1 denotes a wheel composed of a series of layers, each of which preferably consists of two parts arranged to break joints with the adjacent layer, the grain of the several layers throughout the entire number of layers being at right angles to each other. There may be any number of such layers, said number depending upon the size and thickness of the wheel desired. In the drawings the wheel is shown as composed of four layers, which are nailed together. In nailing the sections of the wheel together the nails are driven obliquely or at an angle to said layers, the two inner sections being first nailed together at intervals around and near the outer edge or periphery of the same, as shown at 2. The second annular series of nails is driven through the two inner sections, as shown at 3, the ends of said nails projecting beyond the sides of said inner layers and being adapted to be forced into the inner faces of the two outer layers when the same are arranged in position. A third series of nails is driven through the outer layers of the wheel and into the inner layers of the same, as shown at 4. By nailing the layers of the wheel together in this manner the same will be firmly and rigidly held in place without the necessity of employing bolts for this purpose, and thus obviating the boring of holes through the layers, which necessarily impairs the strength of the wheel.

In the center of the wheel is formed a transversely-disposed hole 5, in which is arranged a metallic hub 6. The hub 6 is preferably composed of an inner section 7, on the inner edge of which is formed an annular flange 8, which is adapted to engage the inner side of the wheel. On the inner face of the flange 8 is formed an annular series of V-shaped lugs or spurs 9, which when the parts of the hub are in position will be forced into the inner face of the wheel. On the inner side of the hub-section 7 is also formed an outwardly-projecting bearing-box 10, the outer end of which is provided with exterior screw-threads 11. On the box 10, at its junction with the inner section 7, is formed an annular series of radially-projecting ribs 12, which are adapted to be forced into the walls of the holes 5 when said bearing-box is projected through the same. On the inner end of the section 7 is formed an annular flange 13, which constitutes a mud-guard or sand-band for the hub.

Adapted to be screwed onto the threaded outer end of the box 10 is an outer hub-section 14, on the inner end of which is formed an annular flange 15, adapted to engage the outer face of the wheel. On the inner face of the flange 15 is formed an annular V-shaped rib 16, which when said section 14 is screwed up upon the box 10 will be forced into the outer face of the wheel.

In applying the hub to the wheel the box 10 is inserted through the hole 5 from the inner side of the wheel and to the projecting threaded outer end of the box is screwed the outer hub-section 14, which when screwed up on said box will firmly clamp the hub to the wheel. The spurs 9 and the rib 16 are forced into the sides of the wheel, while the ribs 12 will be forced into the walls of the hole 5, thereby preventing the hub from turning in the wheel and securely holding the part in place.

On the periphery of the wheel 1 is arranged a pair of metallic bands or tires 17, said bands being arranged adjacent to the outer edges of the wheel, thereby forming between themselves an annular space 18. The inner edges of the bands or tires 17 are beveled or inclined outwardly, as shown at 19, thereby preventing the accumulation of mud or dirt upon the rim of the wheel between the tires 11. This beveled opening between the tires holds the wheel well up on the dirt or mud, greatly lessening the traction resistance of the tires. This construction also prevents all slipping of the wheel on sidehills or on roadways.

A wheel constructed as herein shown and described may be found to be greatly superior to the ordinary construction of heavy drive-wheels, the same being stronger, simpler, and less expensive in construction.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A wheel composed of a series of wood layers nailed together, the nails being driven obliquely through said layers from the opposite sides of the same, a hub composed of an inner flanged section to engage the inner side of said wheel, a bearing-box formed on said inner hub-section, radial ribs and spurs formed on the flanged section, and an outer hub-section adapted to be screwed onto the outer end of said bearing-box, thereby clamping said hub to said wheel, substantially as described.

2. A wheel composed of a series of layers nailed together, the nails being driven obliquely through said layers from the opposite sides of the same, a hub composed of an inner section, an annular flange formed on said section, an annular series of holding-spurs arranged on said flange to engage the inner face of said wheel, a bearing-box formed on said inner section, radially-projecting holding-ribs formed on said box, an outer flanged hub-section adapted to be screwed onto the outer end of said bearing-box, an annular holding-rib formed on the flange of said outer hub-section, and a pair of metal tires shrunk onto the periphery of said wheel, said tires having oppositely-beveled inner edges, substantially as described.

3. A wheel composed of a series of layers nailed together, the nails being driven obliquely through said layers from the opposite sides of the same, a hub composed of an inner section, an annular flange formed on said section, an annular series of holding-spurs arranged on said flange to engage the inner face of said wheel, a bearing-box formed on said inner section and having a tapering bore, radially-projecting holding-ribs formed on said box, an outer flanged hub-section adapted to be screwed onto the outer end of said bearing-box, an annular holding-rib formed on the flange of said outer hub-section, and two metallic bands or tires shrunk onto the periphery of said wheel, said tires being spaced apart and provided with oppositely beveled or inclined inner edges, substantially as and for the purpose described.

In testimony whereof I have hereunto set my hand in presence of two subscribing witnesses.

EDMUND J. WATKINS.

Witnesses:
T. M. FANT,
F. M. HALL.